June 23, 1936. H. G. THOMPSON ET AL 2,044,923
BATTERY
Filed Nov. 6, 1930 4 Sheets-Sheet 1

INVENTORS
Harrison G. Thompson
and Dow B. Hughes
By Ramsey & Kent
their ATTORNEYS June 23, 1936.  H. G. THOMPSON ET AL  2,044,923
BATTERY
Filed Nov. 6, 1930   4 Sheets-Sheet 2

INVENTORS
Harrison G. Thompson
and Dow B. Hughes
By Ramsey & Kent
their ATTORNEYS June 23, 1936.　　H. G. THOMPSON ET AL　　2,044,923
BATTERY
Filed Nov. 6, 1930　　4 Sheets-Sheet 3

INVENTORS
Harrison G. Thompson
and Dow B. Hughes
By Ramsey & Kent
their ATTORNEYS June 23, 1936. H. G. THOMPSON ET AL 2,044,923
BATTERY
Filed Nov. 6, 1930 4 Sheets-Sheet 4

INVENTORS
Harrison G. Thompson
and Dow B. Hughes
By Ramsey & Kent
their ATTORNEYS Patented June 23, 1936

2,044,923

UNITED STATES PATENT OFFICE 2,044,923

BATTERY

Harrison G. Thompson, Montclair, and Dow B. Hughes, Union City, N. J., assignors to Le Carbone Co., Gennevilliers, Seine, France, a corporation of France Application November 6, 1930, Serial No. 493,782

8 Claims. (Cl. 136—86)

The present invention relates to an electric battery cell and more especially to a primary battery adapted for long and relatively heavy duty on either open or closed circuits.

It has been common in the art in batteries using carbon and zinc elements to construct the zinc element of substantially uniform thickness without regard to its mechanical strength as related to the shapes which the zinc undergoes during its consumption while the cell is being used on a closed circuit. These old forms of uniform thickness have resulted in the zincs being rendered useless before the chemical solution has reached its limit of useful life.

Another great difficulty which has been encountered with the cells of these prior art batteries has been the inefficient sealing of the cell against creeping salts from the electrolyte. These salts creep over the battery elements and through joints in the cell so that the salts from the solution are lost and the creepage may reach an extent where the operation of the cell is seriously impaired. This is a particularly serious problem where the batteries are subjected to agitation as where they may be used for marine buoys or other work, such as on moving vehicles on land or in water or air where the electrolyte solution is agitated and slopped around inside the cell.

Where a carbon element is used in a primary battery, this element may become polarized by hydrogen freed adjacent to the carbon element and it is a serious problem in the art to remove or prevent this polarization action. Heretofore it has been impossible to secure a battery of the carbon-zinc type having sufficient capacity and rate of discharge to act efficiently for such service as railway signals and similar service which may be a substantially closed or intermittent circuit. Ordinarily, railway signal batteries utilize chemical depolarizers which are objectionable for several reasons. The battery comprising the present invention has no such chemical depolarization, since the positive element is substantially pure charcoal, but uses the elements of the atmosphere in such a manner as to automatically depolarize the carbon. In order that this depolarizing action shall be effective and the carbon maintained in efficient condition the positive electrode is constructed of carbon which has been rendered impermeable to liquids, for example, by a process set forth in patent to Oppenheim 1,574,845, dated March 2, 1926, or patent to Oppenheim 1,574,844 dated March 2, 1926, or any other suitable process.

The battery comprising the present invention overcomes the difficulties of the old art and is designed more especially for long continued use on either open or closed circuits without requiring frequent inspection. The present battery is particularly adapted for roadway or railway signal work and for other services requiring heavy duty for a primary battery.

The present invention comprises a carbon element and a zinc element with an alkaline electrolyte, preferably comprising caustic soda in solution. The carbon element is preferably a short tubular member of porous carbon with the upper end exposed to atmosphere and protected against any contact with the electrolyte or other liquids in the cell. The carbon member is a soft mass of fine granular carbon which transmits gases through its mass but which is substantially impervious to liquids. The immersed surface of the carbon is in contact with the electrolyte which merely wets the surface of the carbon, while the upper end surface of the carbon is exposed to the atmosphere, and the oxygen from the atmosphere penetrates the carbon and combines with nascent hydrogen molecules, released in the electrolyte adjacent to the surface of the carbon to form water. This prevents the formation of substantial amounts of hydrogen gas bubbles on the surface of the carbon, and thereby obviates polarization of the battery. The upper end of the carbon element is protected by a jacket comprising a tube of polished hard rubber cemented to the carbon by a cement which prevents any creeping of the electrolyte or other liquids between the jacket and the carbon. This jacket performs a number of functions, one of which is to prevent any oil which may be placed on the surface of the electrolyte from reaching the carbon. It also prevents the electrolyte from being slopped over and covering the upper end of the carbon and likewise prevents any free hydrogen which may be formed below the jacket from coming in contact with the upper part of the carbon and being absorbed thereby. Any hydrogen gas which is not combined with the oxygen, as specified, flows upwardly over the smooth jacket and out into the cell above the liquid therein and escapes to the atmosphere. This hard rubber jacket is preferably formed of a rubber which is substantially free from sulphur and which is inert to any chemical action with caustic soda electrolyte.

The zinc element of the battery comprises a removable ring member which is rigidly and fixedly secured in position in the upper part of the cell and around the carbon element. This zinc member has a cross section comprising a relatively thin lower edge which curves upwardly to a thick upper edge. The cross section of this zinc member is determined by plotting across sections of uniform thickness zincs which are eaten away during the operation of the battery on a closed circuit. This was determined carefully by using narrow zinc rings submerged at different depths in the electrolyte, with each ring in a separate circuit through a milliammeter. This novel zinc member, when introduced into the battery, is of such cross section that it retains its mechanical strength, while being consumed by chemical actions of the electrolyte when the battery is in operation on a closed circuit, up until such time that the active chemical part of the electrolyte is substantially exhausted. This results in an efficient disposition of the zinc metal so that the mechanical advantages of support and strength of the zinc give it a life which is the full equivalent of the useful life of the electrolyte. This enables the battery to be used a relatively long period of time without replacement or inspection in severe service where the cell is subjected to mechanical shocks and vibration.

The zinc and carbon elements of the battery are supported beneath and carried by a top member of the cell comprising a supporting top of porcelain or other insulating material. This porcelain top member is provided with breathing openings to admit atmosphere to the upper end of the carbon, which upper end of the carbon is protected by means of the hard rubber jacket, and a suitable gasket sealed against the porcelain top in such manner as to prevent any liquid reaching the top of the carbon while at the same time providing a slight air space between the upper end of the carbon and the top so that the whole top of the carbon is in contact with the atmosphere. This construction permits the oxygen from the air to easily and freely penetrate the carbon to the zone where the carbon and electrolyte meet, and where the oxygen combines with the freed nascent hydrogen. This action of the oxygen passing through the carbon is herein termed "breathing".

The zinc element is used up more rapidly than the carbon element, since the carbon is not consumed but is efficient until it becomes clogged or fouled, and the zinc element is therefore mounted by supports secured to the insulator top in such manner that the zinc element may be easily removed without disturbing the connections through the insulator top, so that the worn out zinc may be easily replaced by a new one. Since the effective life of the carbon, limited by the time when the carbon becomes clogged or fouled, is several times that of the zinc elements, removable indicators of zinc replacements are provided on the top of the carbon which indicators are visible and accessible through the breathing openings in the insulator supporting top. The operator removes one indicator each time a zinc is replaced and fresh solution is added, so that these indicators provide a means of determining when the carbon element should be replaced to insure effective operation of the cell. All metal parts in contact with the electrolyte are steel or other metal with which the chemicals do not react.

Other and further objects of the present invention will in part be obvious and will in part be pointed out hereinafter by reference to the accompanying drawings forming a part hereof.

It is recognized that the present invention may be practiced by variations of the disclosure herewith and therefore this disclosure is to be understood as illustrating a preferred form of the invention and is not to be considered in the limiting sense.

Figure 1:
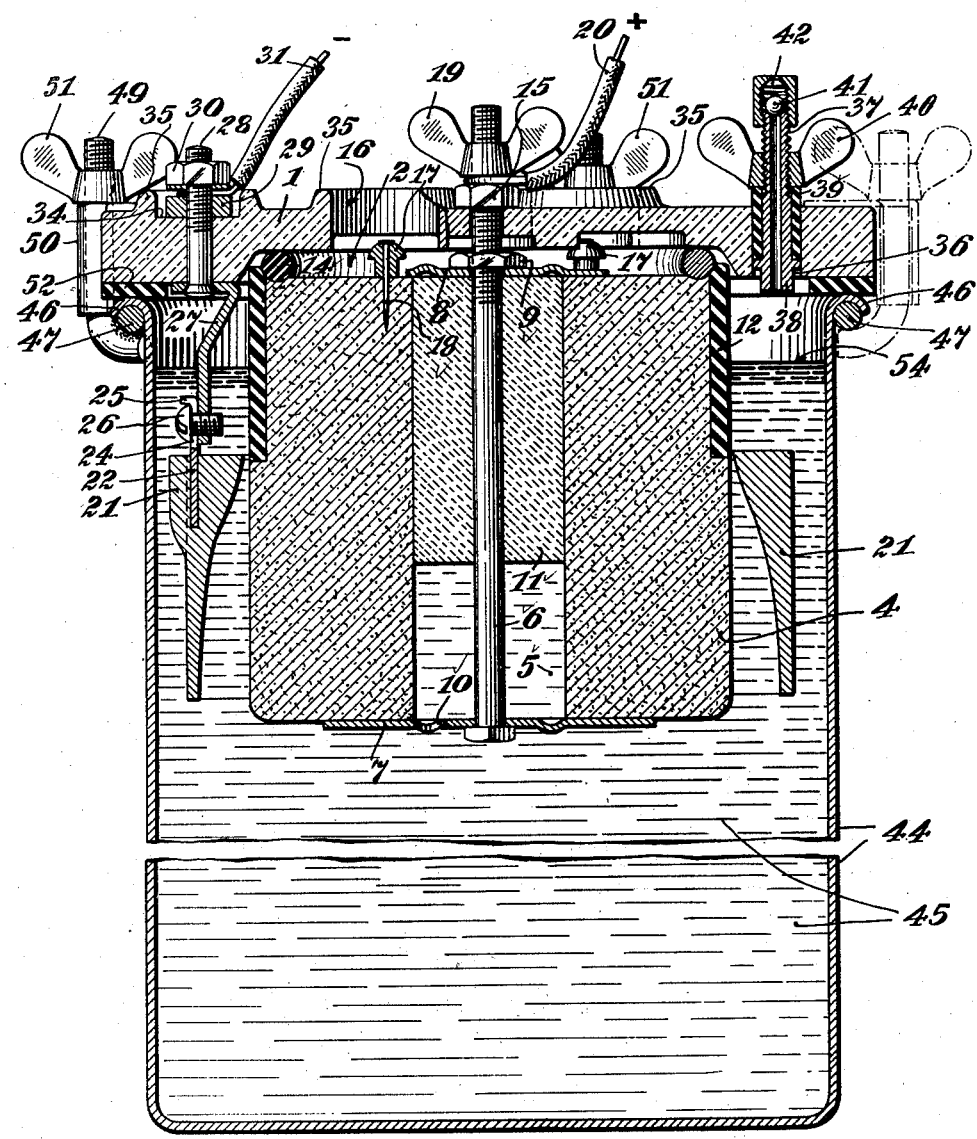
Fig. 1 is a vertical section through an assembled battery cell in accordance with the present invention.
Figure 3:
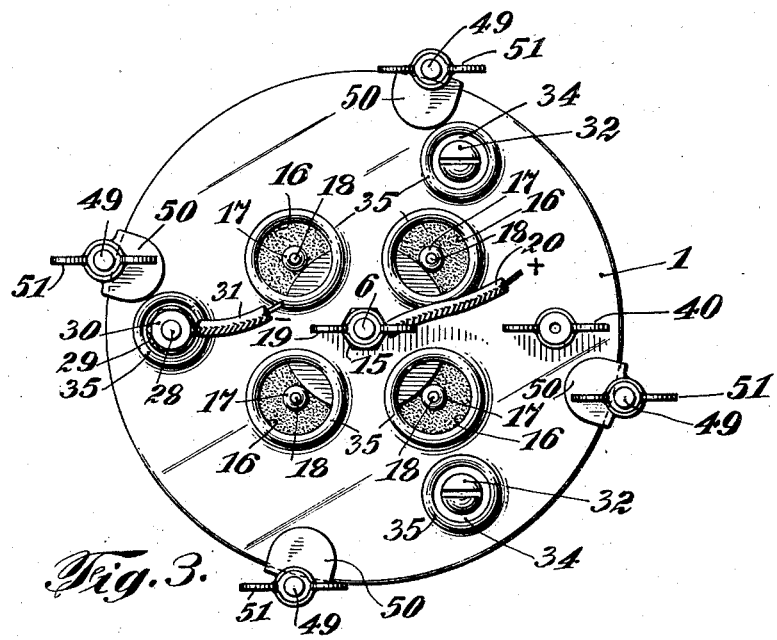
Fig. 3 is a plan view of the battery.
Figure 2:
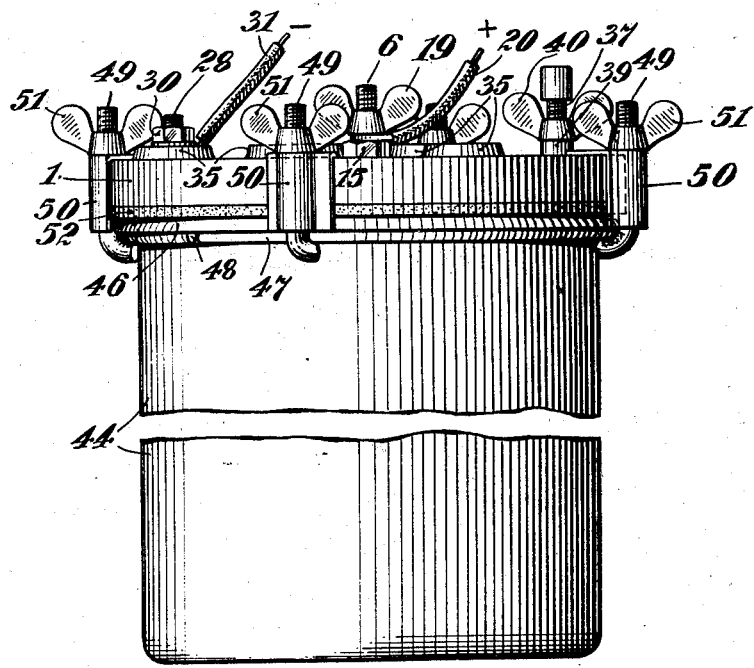
Fig. 2 is a vertical elevation of the outside of the battery cell with a portion broken away.
Figure 4:
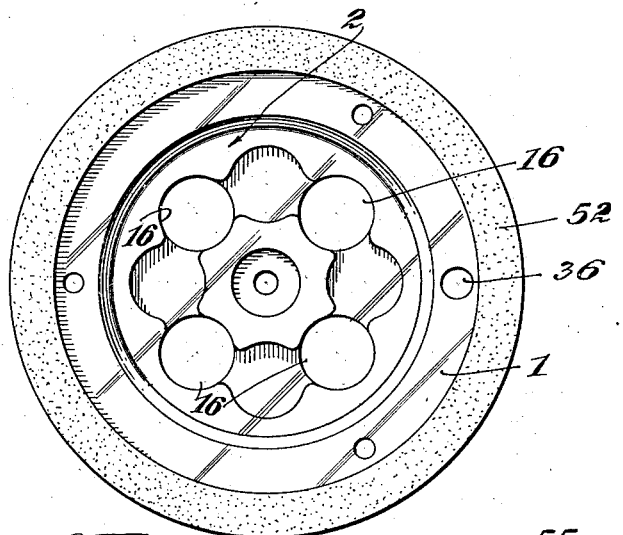
Fig. 4 is a plan view of the under side of the supporting and sealing top.
Figure 5:
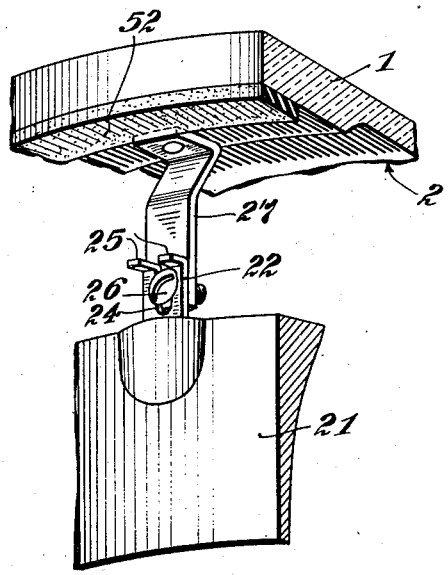
Fig. 5 is a detail illustrating a bracket for supporting the zinc element.

Referring now to the drawings and more especially to Fig. 1, a supporting top 1 is provided with a recess 2 in which the carbon element 4 is mounted. This carbon element 4 is provided with a longitudinal opening 5 through which a supporting bolt 6 extends. Circular plates 7 and 8 comprise electrical contact members for the carbon element with the head of the bolt 6 contacting with the plate 7 and with a nut 9 contacting with the plate 8 in such manner that when the nut is tightened down, the plates 7 and 8 tightly clamp the carbon so that it is rigidly supported, and a substantially low resistance contact is made with the carbon. The plate 7 is provided with a hole 10 through which a compound 11 of an asphaltic base is poured to further support the carbon on the bolt 6, and to seal the opening 5 as shown in the drawings. Before the compound is poured in the bolt 6 is preferably heated to insure a good seal around the bolt. The upper portion of the outside of the carbon element 4 is covered and protected by a sealing jacket 12. This jacket preferably comprises a smooth hard rubber tubular member, free from sulphur or other material that might react with the electrolyte, and is cemented to the carbon with an alkali proof cement in such manner that the cement prevents seepage of any liquid under the protecting jacket. An annular solid rubber gasket 14 is cemented to the upper edge of the jacket 12 which extends above the top of the carbon 4 and is also cemented to the carbon in such manner as to provide a hermetic and liquid proof joint between the gasket 14 and the jacket 12. The sealing compound 11, and the jacket 12 thoroughly protect the upper end of the carbon element against fouling by oil or other materials so that the interior carbon mass is free to breathe. The screw threaded upper end of the bolt 6 extends through an opening in the supporting top 1. When a nut 15 on the said bolt 6 above the top 1, is tightened, the carbon 4 is raised upwardly in such manner as to tightly press the rubber gasket 14 against the top 1 and completely seal the joint between the carbon element and the top so that no liquid or gases may escape from the cell at this juncture. Any liquid or salts on top of the carbon would seal over the carbon and prevent the breathing action.

The supporting top 1 is provided with a plurality of breathing openings 16, there being four illustrated, in such manner as to admit atmosphere to the upper end of the carbon element and by being absorbed by this element meets the nascent hydrogen formed at the meeting zone of the electrolyte and carbon, thereby preventing polarization of the cell by forming the nascent hydrogen into water. Directly beneath the top 1 and accessible through the openings 16 therein are a plurality of indicators 17, there being one indicator beneath each opening 16. These indicators may comprise small red or other colored knobs held in place by means of pins or small nails 18 which extend into the upper end of the soft porous carbon. A wing nut 19 is provided on the outer end of the supporting rod 16 and comprises a binding post for the positive lead wire 20.

The zinc element of the battery comprises an annular ring 21, which is of a predetermined cross section having a thick upper edge and a relatively thin lower edge, as will be hereinafter more fully explained. The upper thick edge of this zinc member carries a plurality of supporting lugs 22, preferably of steel or other metal relatively inactive to the electrolyte. These lugs 22 are bifurcated at 24 and have outstanding tips 25 which act as stops to prevent the lugs from slipping over the head of stub screws 26, which are screw threaded into depending brackets 27 carried by the supporting top 1. This connection is simple and effective in that it permits the stub screws 26 to be loosened sufficiently to enable the tips 25 to be pulled downwardly beneath the heads of the stub screws when it is necessary to change a zinc element. Preferably, there are three brackets 27 depending from the top 1, and three bifurcated supporting lugs 22 on the zinc. One of the brackets 27 is provided with a connector 28 which carries a nut 29 that locks the bracket to the supporting top and a second nut 30 which comprises the binding screw for the negative lead wire 31. This is a decided improvement over the prior art which has been to carry the negative lead wire down into the electrolyte and attach it to the submerged zinc. The remaining brackets 27 are held in place on the supporting top 1 by stub screws 32 which pass through openings in the supporting top 1. In this way, the zinc element is securely and accurately mounted relative to the carbon element 4 so that any shaking or jostling of the cell does not disturb or short circuit the elements. This construction also securely spaces the zinc ring uniformly around the carbon at all times thus making the chemical reaction uniform which results in a substantially uniform voltage characteristic. The breathing openings 16 and recesses 34 in which the screws 32 and the connector 28 are mounted are provided with upstanding annular rims 35, which prevent surface material collecting on the supporting top 1 and falling through the openings. Insulating sealing material may be poured in the recesses about nut 29 and the heads of screws 32 to effectively seal these points against creeping salts. The supporting top 1 is also provided with a filling opening 36 which is suitably sealed by a valve stopper member 37 when the battery is installed. This stopper may comprise a ball valve having a stem 38 carrying a soft rubber tube 39 that may be expanded by the nut 40 to removably lock the stopper in place. This ball valve permits the escape of gases (such as hydrogen) from the cell but prevents the escape of liquids by the ball 41 being forced against the seat 42. When no gases are escaping from the cell, ball 41 remains on its lower seat, thereby preventing the entry of air to the cell space surrounding the sleeve 12; and the passageway leading to ball 41 is so small that reverse flow of air does not take place while ball 41 is raised by escaping cell gases.

From the foregoing, it will be observed that the supporting top 1 carries the carbon element 4 and the zinc element 21 in fixed assembled relation so that this entire group of the essentials of the battery may be handled as a unit for replacement, inspection, or other desired use. It also is a convenient and desirable arrangement for assembly of the parts when the battery is being put together.

The assembled unit, comprising the top 1, carbon 4 and the zinc 21 is adapted to be supported upon a suitable jar 44, which contains the electrolyte 45 of caustic soda solution. This jar 44 as illustrated comprises a metal jar covered both interiorly and exteriorly with suitable vitrified enamel and the mouth of the jar is provided with an out-turned lip 46. An annular retaining ring 47, preferably provided with open ends comprising a slot 48, is adapted to set beneath the lip 46. This annular retaining ring carries upstanding clamping posts 49 which preferably are welded to the ring and which posts pass through clamps 50. Wing nuts 51 are provided for the upper ends of the posts 49 and an annular flat sealing ring of rubber 52 is provided between the end of the jar 44 and the under part of the top 1, so that when the wing nuts are screwed down on the posts 49, the retaining ring 47 tightly clamps the mouth 46 of the jar against the gasket 52, thereby effectively sealing this joint.

After the parts are assembled with the several gaskets tightly compressed to seal the joints, the electrolyte may be introduced into the jar through the opening 36 until the electrolyte is above the jacket 12 on the carbon. This height may be ascertained by a measuring rod introduced through the opening 36. A layer of oil 54 may then be poured on the electrolyte to prevent evaporation of the electrolyte. The battery is now ready for operation and is adapted for long periods of use on either open or closed circuits.

Figure 7:
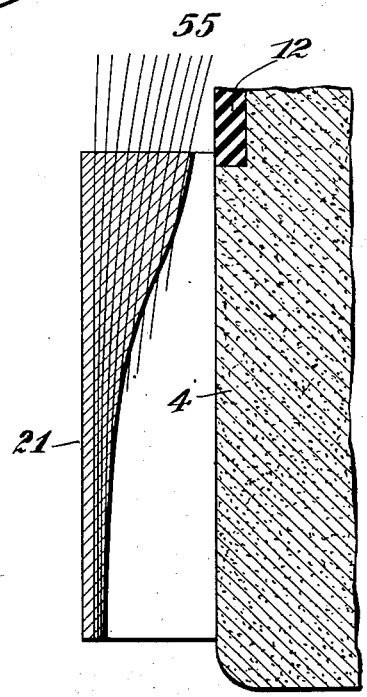
Fig. 7 is a view illustrating the method of determining the cross section of the zinc member.
Figure 6:
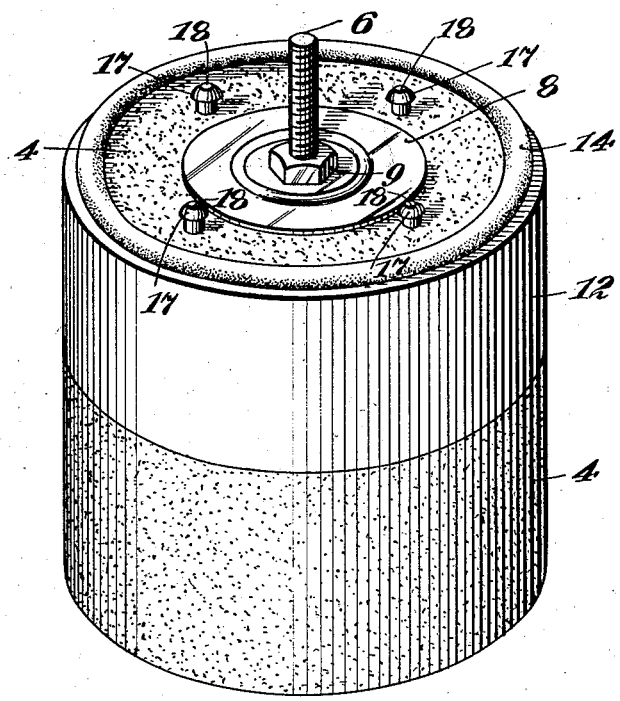
Fig. 6 is a perspective view illustrating the carbon element and the zinc element spaced apart.
Figure 6:
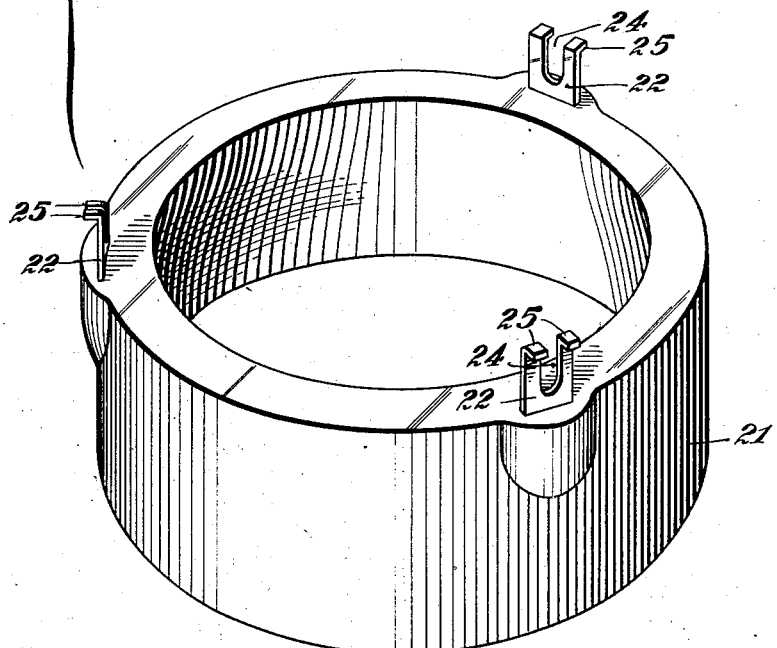

Referring now to Fig. 7, a section of the zinc member 21 is illustrated adjacent a portion of the carbon member 4. The lines 55 indicate the lines of consumption of the zinc member and thereby clearly illustrate the manner in which the zinc member is consumed. From these consumption lines 55, it will be observed, that the zinc member is so formed as to provide a substantial cross section of zinc for a long period of the battery life with a minimum amount of zinc in the zinc element.

From the foregoing, it will be observed that the present battery provides a compact construction with ample space in the jar beneath the battery elements to allow an ample supply of electrolyte solution sufficient to last the life of the zinc element without impairing the efficient operation of the cell. The carbon element 4 which is of a fine compressed granular form resists the entrance of the electrolyte beyond a slight surface wetting. The interior of the carbon remains free from the electrolyte and affords opportunity for the oxygen of the air to reach the surface portions of the carbon which are wetted by the electrolyte, and there combine with the nascent hydrogen produced by the battery. Thus the formation of hydrogen gas bubbles is minimized, thereby maintaining the surface of the carbon at all times at substantially full efficiency. All joints leading to the exterior of the battery are thoroughly and effectively sealed in such manner that even though the battery be inverted, there is no possibility of leakage of the electrolyte and no danger of the salts from the electrolyte escaping from the interior of the jar. The indicators provided on the upper end of the carbon and which are visible through the breather openings permit inspection of each individual cell to indicate the normal number of zinc replacement left before the carbon should be changed to obviate leaving a clogged or fouled carbon in the battery. The mountings for the zinc and the carbon are both rigid and simple so that these elements may be replaced with a minimum amount of disassembly of the cell.

The type or shape of the jar is relatively unimportant so long as the substance of the container does not react with the chemicals used and the jar is sufficiently strong for the particular service of the cell. Glass jars are well adapted for many types of service.

Where the battery cell is used for railway signal work or other duty where the battery remains stationary at all times, the clamping ring and its attended parts together with the gasket between the top cover and the jar may all be omitted, and the oil seal on the electrolyte is relied upon to prevent evaporation and creepage of the salts from the solution.

Having described our invention, we claim:—

1. For a battery having a liquid electrolyte, a replaceable unit which is self-sealing to the cover of the battery, comprising: a coherent piece of carbon to be partially immersed in the electrolyte, a protective jacket of solid inert material closely embracing the upper portion of the carbon and projecting above the carbon, cement hermetically sealing the jacket to the carbon, and an annular gasket fixedly cemented to the projecting portion of the jacket and also to the adjoining surface of the carbon.

2. For a battery having a liquid electrolyte, a replaceable unit to be sealed to the cover of the battery, comprising: a unitary coherent piece of carbon, a hard rubber jacket embracing the upper portion of the unitary piece of carbon and hermetically sealed thereto, and suspension means permanently attached to said carbon for suspending the carbon from the battery cover, said suspension means extending to the interior of the piece of carbon and being hermetically sealed thereto.

3. A battery comprising: a cover having a perforated zone and otherwise closed against the influx of air, a coherent piece of activated carbon of high porosity suspended from the cover beneath said perforated zone whereby air has access to the carbon, a jacket of solid inert material embracing the upper portion only of said carbon and hermetically sealed thereto, a body of liquid electrolyte having its upper surface layer spaced from the cover and in contact with said jacket, and an annular seal between said jacket and cover, such annular seal surrounding the perforated zone of the cover and thereby preventing communication between the perforation in the cover and the surface of the electrolyte.

4. A battery comprising: two replaceable pole members, one of which has a longer initial life than the other, and at least one removable indicator attached to the pole member of longer initial life.

5. A battery comprising: a carbon pole member, a zinc pole member, a plurality of removable indicators affixed to the top of the carbon member, and a cover having open space through which said indicators are visible and removable.

6. A battery comprising: a vessel to hold liquid electrolyte; a cover for the vessel; a carbon pole member supported by and depending from the cover; an insulating sleeve embracing the upper portion of the carbon; an annular zinc pole member surrounding the carbon member in close proximity thereto, the internal diameter of the zinc being different at different levels and a minimum adjacent to the top of the zinc; supporting means depending from said cover; and means affixed to the zinc to detachably secure the zinc to said supporting means with the top of the zinc positioned higher than the bottom of said insulating sleeve.

7. For a battery, an annular zinc pole member having an external diameter which is substantially constant, and having an internal diameter which decreases progressively from bottom to top, the rate of such decrease being considerably greater in the upper half of the pole member.

8. A battery comprising: a vessel to hold liquid electrolyte; a cover for the vessel; a carbon pole member supported by and depending from the cover; an insulating sleeve embracing the upper portion of the carbon; an annular zinc pole member surrounding the carbon member in close proximity thereto, the internal diameter of the zinc being different at different levels and a minimum adjacent to the top of the zinc; and means to detachably secure the zinc to the cover with the top of the zinc positioned higher than the bottom of said insulating sleeve.

HARRISON G. THOMPSON.
DOW B. HUGHES.